Jan. 3, 1939.  P D. MERRILL  2,142,452
PIPE JOINT SEAL
Filed April 7, 1937   2 Sheets-Sheet 2
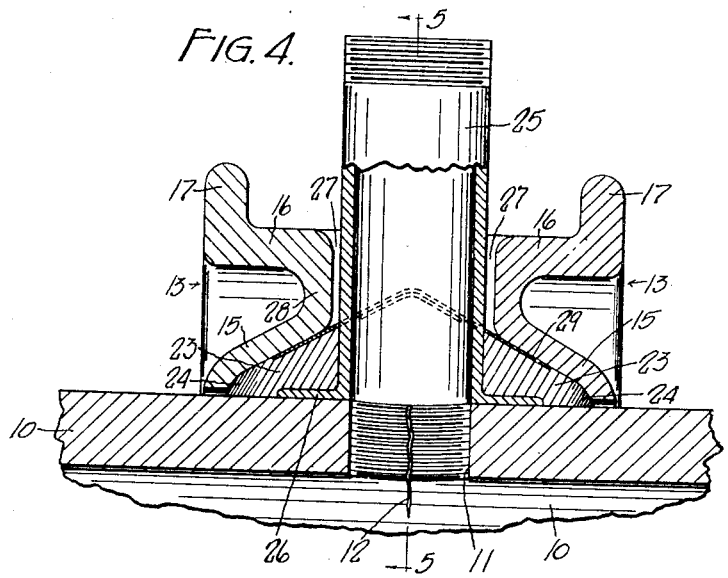
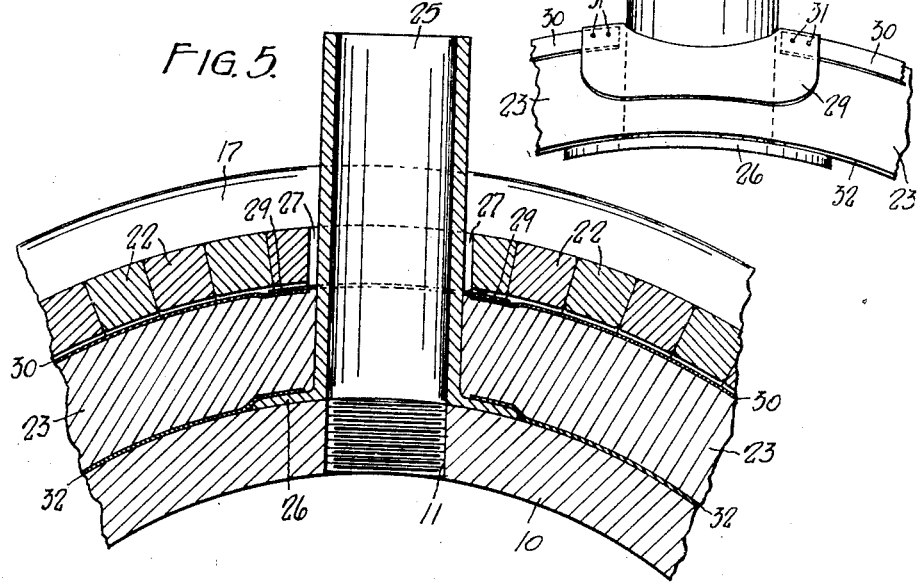
INVENTOR.
PATTERSON D. MERRILL.
BY
Oltsch & Knoblock
ATTORNEYS.

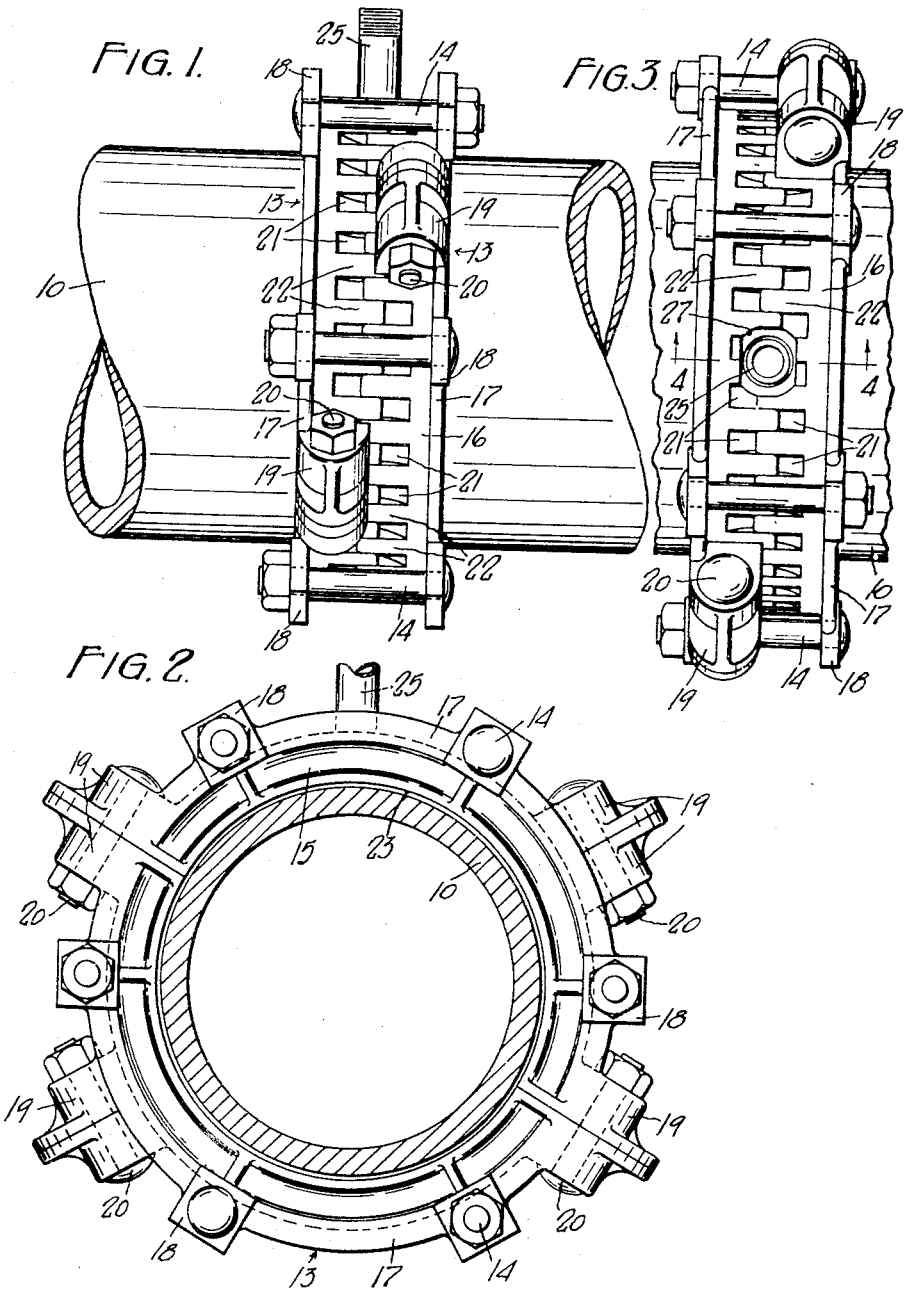

Patented Jan. 3, 1939

2,142,452

UNITED STATES PATENT OFFICE 2,142,452

PIPE JOINT SEAL

Patterson D. Merrill, South Bend, Ind., assignor to
M. B. Skinner Company, South Bend, Ind.

Application April 7, 1937, Serial No. 135,382

4 Claims. (Cl. 285—195)

This invention relates to improvements in pipe joint seals, and particularly to means for providing a seal for a pipe leak at or adjacent a point at which a branch pipe connects with the leaking pipe.

Heretofore great difficulty has been experienced in sealing pipes which have developed leaks at the point where a branch pipe connects therewith. Such breaks or fractures frequently occur in a pipe at the point where a hole has been cut therein and threaded to receive a branch pipe. The problem presented by such fractures involves the difficulty of removing the leaking section of the main pipe, the apertured condition of the main pipe, and the necessity for maintaining a branch connection at the point of leak. In some instances sealing means in the nature of T-shaped sleeve arrangements or the like encompassing the main and branch pipe adjacent the leak have been employed. Such sleeve arrangements are unsatisfactory and objectionable, however, because of the great expense thereof, the difficulty of application thereof, the complicated construction thereof, and the great weight and excessive installation time involved.

It is therefore the primary object of this invention to provide means for sealing a pipe at a leak adjacent a branch pipe and constructed to overcome the objections met in prior devices.

A further object is to provide a simple device for directly sealing a pipe leak by encompassing both the main pipe and the pipe branching therefrom by a single gasket.

A further object is to provide a novel construction of seal having a branch pipe connector communicating with a main pipe and held to place by the sealing gasket.

A further object is to provide a device wherein a sealing gasket and clamping rings serve to seal a leak and to lock a branch pipe in operative communicating relation to a main pipe.

A further object is to provide an arrangement wherein a branch pipe extends through and is carried by a sealing gasket.

A further object is to provide a seal comprising a gasket ring through which a conduit extends, and means for pressing said gasket into sealing relation to a main pipe and to a joint between said main pipe and said conduit.

A further object is to provide a sealing device with novel means for locking a branch connector in stationary sealed relation to a pipe in communication with a pipe opening.

Other objects will be apparent from the drawings, specification and the appended claims.

In the drawings:

Fig. 1 is an edge view illustrating my device applied to a pipe at a branch connection.

Fig. 2 is a sectional view through the pipe and showing the sealing device in full side view.

Fig. 3 is another edge view of the device.

Fig. 4 is a fragmentary enlarged sectional view taken on line 4—4 of Fig. 3.

Fig. 5 is a fragmentary enlarged sectional view taken on line 5—5 of Fig. 4.

Fig. 6 is a fragmentary enlarged side view of the gasket, branch connector and associated parts of the device.

Referring to the drawings, the numeral 10 designates a pipe having a threaded hole 11 therein for connection of a threaded branch pipe (not shown) therewith, and which pipe has fractured at 12.

For the purpose of sealing the break or leak 12 I prefer to employ a sealing clamp of the general character shown in McMurray Patent No. 1,948,274, dated February 20, 1934. This clamp comprises a pair of opposed sectional clamping rings 13 which are drawn together by clamping bolts 14. Each ring comprises an inner substantially conical gasket engaging portion 15, a substantially cylindrical portion 16 formed integrally with and projecting outwardly from the large diameter side of portion 15, and an annular outwardly projecting reinforcing flange 17. The flanges 17 of the rings are enlarged at spaced points to form ears 18 between which the clamping bolts 14 extend. The parts of each ring are provided with enlarged end portions 19 through which pass bolts 20 which serve to connect said ring parts rigidly in ring form. The normally inwardly disposed side of each ring is provided with a plurality of equally spaced cut-aways or recesses 21 which define spaced finger-like projections 22. The rings are arranged with the projections 22 of each fitting into the recesses 21 of the other, whereby said rings may move toward and from each other telescopically at these projections.

When the rings are arranged in operative relation, they provide between the parts 15 thereof a substantially V-shaped interior annular chamber to receive a gasket 23 which is of substantially triangular shape in cross section. Gasket 23 is preferably formed of soft rubber, and is provided with marginal portions 24, which comprise noselike or tip portions in cross section as best illustrated in Fig. 4, and these portions 24 are of much harder rubber than the main body portion of the gasket. Gasket 23 is preferably a split ring fitting tightly about pipe 10 with its ends abutting to completely encircle the pipe.

Gasket 23 is provided with an opening extending radially therethrough at one point centered between its sides, and in this opening snugly fits a tubular connector 25, as best illustrated in Fig. 4. The inner end of connector 25 is provided with a flange 26 projecting outwardly therefrom and contoured to fit against pipe 10 in full face engagement, as best illustrated in Figs. 4 and 5. The outer end of connector 25 projects a substantial distance from the gasket and terminates in a threaded end portion for connection with the branch pipe (not shown).

Adjacent portions of the clamping rings are cut away at 27 to accommodate extension of the connector therethrough without interfering with the movement of said clamping rings in the direction of each other to compress the gasket. The portions so cut away are at the juncture of the ring parts 15 and 16, the cut being preferably so made that at least a web 28 interconnects said parts as shown in Fig. 4.

A saddle plate 29 having a central opening receiving the connector 25 fits snugly on the gasket, said plate being V-shaped in cross section and being longitudinally curved to conform to the gasket curvature. Plate 29 is of a size and shape to underlie the ring parts 15 at the margin of opening 27, whereby it forms means to prevent the extrusion of the gasket under pressure at said opening 27. A conventional metal strip 30 of V-section encircles the center portion of the gasket. Portions thereof underlie the plate 29 and are welded or otherwise secured thereto at 31. Thus the saddle plate 29 and ring 30 become an integral extrusion-preventing means, said ring 30 preferably being split in spaced relation to said saddle plate to permit application and removal of the unit relative to the gasket as is conventional. Where desired or necessary, a split ring 32 may fit in the inner periphery of the gasket, terminating between the gasket and the flange 26 of the connector. The ring 32, and strip 30, are preferably formed of thin strips of a suitable strong alloy, such as Monel metal.

When leak 12 is discovered, the branch line is first preferably disconnected from the main pipe. The gasket ring 23, with the connector 25 in operative relation thereto, is then applied around pipe 10 with said connector in registration with the threaded pipe opening 11. A stick or other suitable elongated member (not shown) may be passed through the connector 25 and hole 11 and into the pipe to hold said connector in desired registering relation to hole 11 until the parts are all operatively assembled, as will be obvious. The unit comprising ring 30 and saddle plate 29 is then operatively positioned to encircle the gasket. In the event the inner ring 32 is required, the same is either applied to the pipe before application of the gasket or is preassembled with the gasket and connector for application to the pipe with said parts. The gasket, connector and associated parts having been operatively applied to the pipe, the clamp parts 13 are assembled and interconnected by the draw bolts 14 as is conventional to compress the gasket and seal the leak.

The clamp rings 13, when drawn together, apply both transverse and radially inward pressure to the gasket. This radially inward pressure component is the result of the sliding of teeth 22 of each in the recesses 21 of the other to bring the clamp parts together and thereby reduce the space between the pipe and the point of intersection of the interdigitally arranged conical gasket engaging clamp portions 15. The outer ring 30 and saddle plate 29 confine the gasket to prevent extrusion thereof at the center toothed portion of the clamp assembly; and the pipe, connector and inner ring 30 confine the gasket against extrusion at its inner periphery. The hard rubber margins 24 of the gasket serve to confine the gasket against extrusion between the clamping rings and the pipe at the sides of the gasket. Thus the gasket is completely confined, whereby the main body of the gasket may be formed of very soft rubber which can be reshaped to effect the desired seal upon application of minimum pressure thereto. Thus the main gasket body becomes, in effect, a confined hydraulic sealing body. The cold-flow of the gasket body has, of course, the effecting of a positive seal for the leak as its primary function. However, of substantial importance is the fact that the substantially hydraulic character of the confined gasket body transmits the applied pressure to the flange 26 of connector 25 to force and maintain the same in solidly seated relation on pipe 10. Thus, when the branch pipe is secured to connector 25, with the application of turning stress to the connector as incident to tightening a union between the connector and branch pipe, such turning stress is resisted by the pressure of clamping members applied to the connector flange 26 through the medium of the substantially hydraulic compressed gasket body. In other words, the gasket is so confined by the clamping rings and associated parts that it resists such stresses as may be applied to the connector in securing the parts in operative relation. Thus there is no danger of displacement of the connector to destroy the seal at the point 12 of leak or fracture or to permit any leak between pipe 10 and the connector.

It will be understood, of course, that the confining strips 30 and 32 prevent extrusion of the soft rubber gasket at cut-out 27, recesses 21 and at the pipe leak 12. Likewise, the gasket compression and reforming is adequate to bring the gasket body into sealing engagement with the clamp rings, pipe, etc., around the off-sets formed by the confining rings, and also with the body of the connector 25.

I claim:

1. In combination, a pipe having an opening therein, a gasket encircling said pipe at said opening, a connector projecting through said gasket and bearing on said pipe in register with said opening, and means for compressing said gasket in sealing relation on said pipe and connector, the compression of said gasket holding said connector in operative relation to said pipe.

2. In combination, a pipe having an opening, a gasket encircling said pipe at said opening, clamping means encompassing said gasket, and a tubular member communicating with said opening and projecting through said gasket and clamping means, said tubular member including a portion projecting laterally therefrom and engaging said pipe in under-lapping relation to said gasket.

3. In combination, a pipe having an opening, a connector communicating with said opening, a gasket encircling said pipe and the inner end of said connector, and means for compressing and confining said gasket, said gasket being sufficiently soft to cold-flow and exert positioning stress on said connector when compressed.

4. In combination, a pipe having an opening, a gasket ring around said pipe, a circumferentially divided two-part clamping ring for compressing said gasket, a confining ring encircling said gasket and marginally overlapped by said clamping ring parts, said gasket, confining ring and clamping ring having registering openings, and a connector in said last named openings and positioned in communication with said pipe opening by said gasket.

PATTERSON D. MERRILL.